(12) United States Patent
Billich

(10) Patent No.: US 10,940,727 B2
(45) Date of Patent: Mar. 9, 2021

(54) TOWING HITCH

(71) Applicant: Deere & Company, Moline, IL (US)

(72) Inventor: Manuel Billich, Dischingen (DE)

(73) Assignee: DEERE & COMPANY, Moline, IL (US)

(*) Notice: Subject to any disclaimer, the term of this patent is extended or adjusted under 35 U.S.C. 154(b) by 293 days.

(21) Appl. No.: 16/034,595

(22) Filed: Jul. 13, 2018

(65) Prior Publication Data

US 2019/0016184 A1 Jan. 17, 2019

(30) Foreign Application Priority Data

Jul. 13, 2017 (DE) .......................... 102017212047.9

(51) Int. Cl.
| | | |
|---|---|---|
| *B60D 1/44* | (2006.01) | |
| *B60D 1/42* | (2006.01) | |
| *A01B 69/08* | (2006.01) | |
| *A01B 59/00* | (2006.01) | |
| *B60D 1/06* | (2006.01) | |
| *B60D 1/24* | (2006.01) | |
| *A01B 59/042* | (2006.01) | |
| *B60D 1/00* | (2006.01) | |

(52) U.S. Cl.
CPC .............. *B60D 1/42* (2013.01); *A01B 59/004* (2013.01); *A01B 69/006* (2013.01); *B60D 1/06* (2013.01); *B60D 1/246* (2013.01); *A01B 59/008* (2013.01); *A01B 59/042* (2013.01); *B60D 1/44* (2013.01); *B60D 2001/008* (2013.01)

(58) Field of Classification Search
CPC ............. B60D 1/42; B60D 1/44; B60D 1/246
USPC .......................................... 280/478.1, 479.1
See application file for complete search history.

(56) References Cited

U.S. PATENT DOCUMENTS

| | | | | |
|---|---|---|---|---|
| 3,487,448 A | * | 12/1969 | Waschek ................... | B60D 1/44 280/468 |
| 5,236,214 A | * | 8/1993 | Taylor .................... | B60D 1/155 280/402 |
| 5,692,573 A | * | 12/1997 | Zahn ..................... | A01B 59/042 172/439 |

(Continued)

FOREIGN PATENT DOCUMENTS

| | | |
|---|---|---|
| DE | 10304978 A1 | 8/2004 |
| DE | 102013211510 A1 | 12/2014 |

(Continued)

OTHER PUBLICATIONS

European Search Report issued in counterpart application No. 18182757.7, dated Dec. 11, 2018 (7 pages).

(Continued)

*Primary Examiner* — Tony H Winner

(57) ABSTRACT

The disclosure relates to a towing hitch for a work vehicle. The towing hitch includes a retaining element. A coupling member coupled to the retaining element. A guide element having at least one guide channel formed therein; wherein the guide channel is sized to receive a portion of the retaining element. An actuator coupled to at least one surface of the retaining element, wherein the actuator is arranged such that lateral displacement of the actuator moves the retaining element between a first position and a second position within the guide channel of the guide element.

14 Claims, 11 Drawing Sheets

(56) References Cited

U.S. PATENT DOCUMENTS

| | | | | |
|---|---|---|---|---|
| 5,997,024 | A * | 12/1999 | Cowley | A01B 59/066 |
| | | | | 280/478.1 |
| 10,308,086 | B2 * | 6/2019 | Tiainen | B60D 1/44 |
| 2004/0021292 | A1 | 2/2004 | Abair | |
| 2004/0021293 | A1 * | 2/2004 | Pogue | B60D 1/143 |
| | | | | 280/478.1 |
| 2007/0138760 | A1 * | 6/2007 | Granzow | B60D 1/246 |
| | | | | 280/491.2 |
| 2010/0213687 | A1 * | 8/2010 | McDaniel | B60D 1/40 |
| | | | | 280/491.2 |
| 2014/0343802 | A1 | 11/2014 | Pichlmaier | |
| 2015/0173291 | A1 | 6/2015 | Muller et al. | |
| 2015/0201546 | A1 * | 7/2015 | Muller | A01B 69/004 |
| | | | | 701/50 |
| 2017/0079191 | A1 * | 3/2017 | Cunningham | A01B 63/12 |
| 2019/0322144 | A1 * | 10/2019 | Shaeff | B60D 1/52 |

FOREIGN PATENT DOCUMENTS

| | | |
|---|---|---|
| DE | 102013211516 A1 | 12/2014 |
| DE | 102014113448 A1 | 3/2016 |
| EP | 2893794 A1 | 7/2015 |

OTHER PUBLICATIONS

German Search Report issued in counterpart application No. 102017212047.9 dated Apr. 11, 2018 (12 pages).

* cited by examiner

TOWING HITCH

RELATED APPLICATIONS

This application claims priority to German Application No. 102017212047.9, titled "Towing Hitch," filed Jul. 13, 2017, which is hereby incorporated by reference in its entirety.

FIELD OF THE DISCLOSURE

The present disclosure present disclosure relates generally to a towing hitch including a coupling member for use with an work vehicle.

BACKGROUND OF THE DISCLOSURE

A variety of coupling devices designed for use with work vehicle are known, by means of which trailers, attachments or implements may be coupled to the towing vehicle (e.g., a tractor). More and more powerful implements are being used more and more frequently in agricultural technology, requiring a correspondingly high-performance work vehicle such as a tractor.

Due to the increasing support loads for attached implements with running gear of their own, it is preferable to use a ball-head coupling, particularly with a bottom hitching design. In a bottom hitching design, a jointed shaft which is required for operating the implement, for example, runs above the ball-head coupling.

Large vehicle combinations have the disadvantage of having a relatively large turning radius. For example, the turning radius is usually not limited by the maximum tractor steering angle, but by the angle between the tractor and the implement, because it is essential to avoid contact between the implement tow bar and the lower links of the hitch or the rear wheels of the tractor.

Weights may be mounted on the rear wheel rims of a tractor in order to optimize the weight and the axle load. Mounting and dismounting the wheel weights is relatively laborious. In addition, wheel weights increase the moment of inertia of the wheels. This has a negative effect on the acceleration and deceleration behavior of the tractor. Furthermore, a continuously variable axle load adjustment while driving is not possible. With such conventional approaches, it is often not possible to see the coupling element from the cab, which makes the hitching process more difficult.

To address such concerns, some conventional approaches employ the use of rear-mounted towing hitches including two vertically oriented side cheeks supported on the vehicle rear end and a plate bearing a coupling member. The plate may be secured in a transport position or a working position.

Other conventional approaches employ similar towing hitches having vertically oriented side cheeks. With such hitches, in a working position, the plate may be retracted in a horizontal guide groove at the lower end of each side cheek, the grooves opposing one another, and may be locked by means of at least one positioning pin. The rear ends of the side cheeks are designed such that they have a smaller lateral width in the region of the lower ends of the side cheeks. Drawbacks to such designs include poor load optimization, wide turn radiuses leading to decreased vehicle performance, as well as ineffective hitching processes. As such, there is a need in the art for an improved towing hitch.

SUMMARY OF THE DISCLOSURE

The present disclosure addresses the problem of specifying a towing hitch for an agricultural vehicle that enables a small turning radius of the vehicle combination. The towing hitch is also intended to contribute to a load optimization of the agricultural vehicle. It is also intended that the hitching process for an implement should be facilitated by the towing hitch of the present disclosure. The vehicle combination should have better driving and braking properties due to the towing hitch according to the present disclosure. In addition, stable driving behavior should be achieved.

According to an aspect of the present disclosure, a towing hitch for use with a work vehicle is disclosed. The towing hitch includes a retaining element, a coupling member coupled to the retaining element, a guide element having at least one guide channel formed therein that is sized to receive a portion of the retaining element, and an actuator coupled to a surface of the retaining element. The actuator is arranged such that lateral displacement of the actuator moves the retaining element between a first position and a second position within the guide channel of the guide element.

According to the present disclosure, the coupling member of the towing hitch is arranged displaceably. It is connected to an actuator for the displacement. To design the coupling member to be displaceable longitudinally by means of a continuously operating actuator has shown certain advantages. The term "longitudinally displaceable" is understood below to mean a displacement in or contrary to the direction of travel. The coupling member is preferably displaced largely horizontally. The term "largely horizontally" may mean an angle to the horizontal of less than 45°, less than 30°, or even less than 15°.

In certain embodiments, the actuator includes at least one working cylinder, hydraulic cylinders and/or pneumatic cylinders being particularly suitable. For example, in one embodiment of the present disclosure, a double-acting cylinder is used, which may operate either hydraulically or pneumatically. Use of the double-acting hydraulic cylinder is beneficial because at least one sufficient hydraulic power source is available in the tractor, and a relatively simple implementation is also possible, because high cylinder forces may be achieved in a hydraulic unit with a compact overall size. In other embodiments, an electric motor having a threaded spindle may be used as the actuator.

Additionally, in other embodiments, the coupling member may be arranged such that the support load of the coupling member is absorbed via a longitudinal guide and not exclusively by the actuator itself. In an alternative embodiment of the present disclosure, the towing hitch may include a guide element for this purpose. This guide element absorbs support loads, particularly support loads that act in a vertical direction. This protects the actuator from damage due to high support loads, among other things. The guide element may have a rail and/or a groove for this purpose. The guide element guarantees a longitudinal displacement, largely in the horizontal direction at only a relatively small angle of inclination to the horizontal of less than 45°, less than 30°, or in some embodiments less than 15°.

In certain embodiments, the coupling member is connected to a retaining element. The retaining element maybe a supporting plate, for example. The coupling member is fixedly connected to the retaining element. For example, the coupling member maybe welded onto the plate or fastened by a threaded connection.

In another embodiment of the present disclosure, the retaining element is arranged displaceably in the guide element. For example, the guide element maybe side cheeks, which have a groove in which the retaining element formed as a plate is displaceably arranged. Thereby the position of the coupling member maybe varied as needed. For example, the use of a continuously adjustable coupling member maybe advantageous. A position of the coupling member for the respective application case may be adjusted by the continuous displaceability of the coupling member.

In other embodiments of the present disclosure, the device has sensors that may collect data and then transfer it to a corresponding unit, which then determines a position of the coupling member on the basis of the data and drives the actuator accordingly so that it brings the coupling member into a position for a given situation by means of a lateral displacement. The unit may be an evaluation device and/or a control device and a regulation device, for example. For instance, a PID controller or a programmable logic controller (PLC) may be used for this purpose. The position of the coupling member is determined on the basis of the collected data. A driving behavior of the work vehicle is guaranteed by this method according to the present disclosure.

By means of the towing hitch according to the present disclosure, a reduction of the turning radius for a combination of a work vehicle and an implement is possible. In addition, an axle load may be shifted. When coupling the towed system to the work vehicle, it is also possible to displace the coupling member such that visibility from the cabin is enabled and thereby the hitching process is facilitated. The coupling member may include a ball-head coupling. It has proved to be advantageous if the coupling is implemented with a bottom hitching design.

In certain embodiments, the work vehicle is additionally equipped with a front ballast. It proves favorable if the front ballast is movably arranged, preferably displaceable longitudinally. By means of the combination according to the present disclosure of a displaceable towing hitch with a movable front load, stability of the work vehicle may be achieved for every application case. The position and arrangement of the towing hitch and/or the front ballast relative to the work vehicle may be shifted during driving operation. This may optimize the driving stability.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
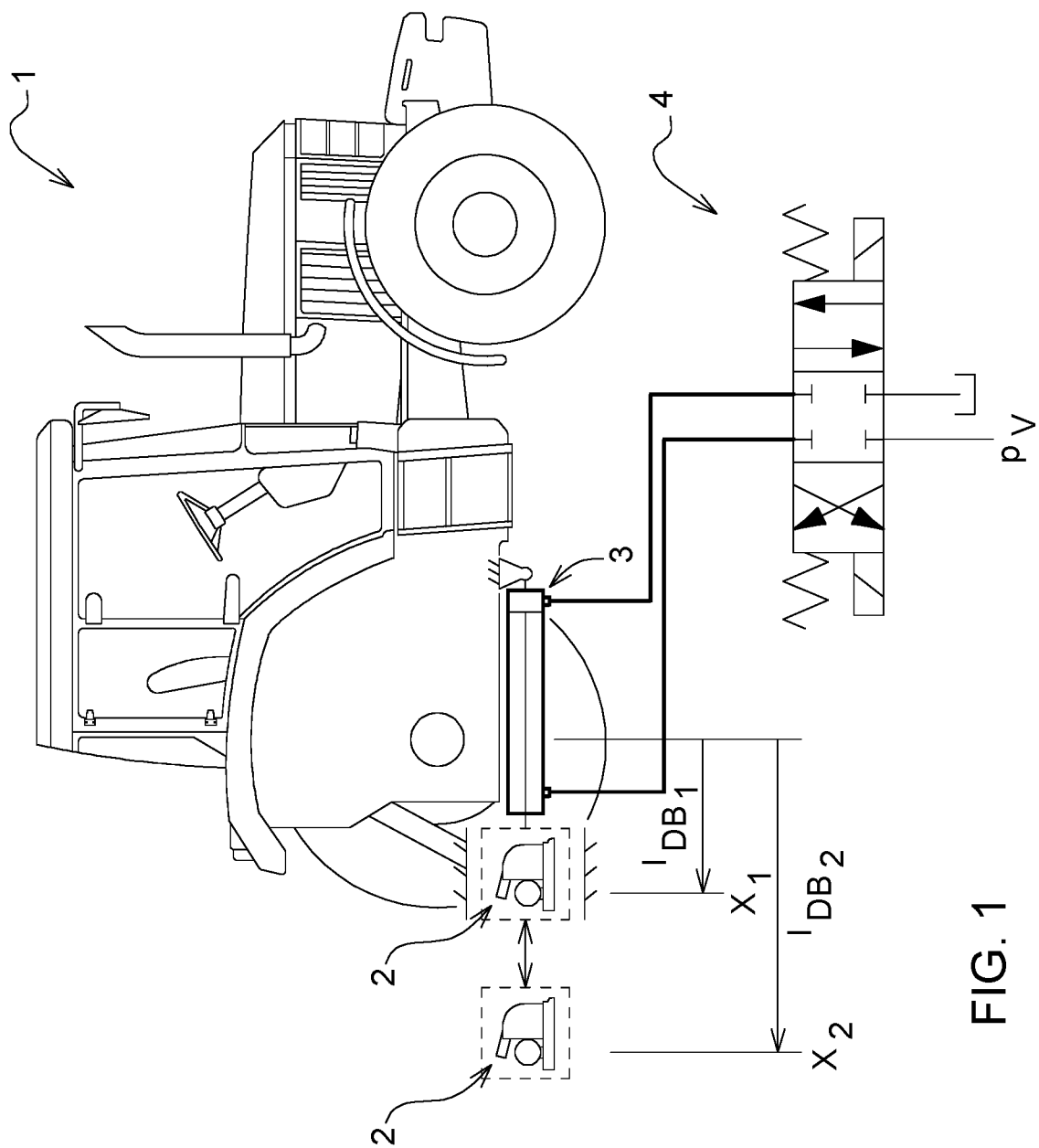
FIG. 1 is a schematic illustration of a work vehicle having a towing hitch and a hydraulic actuator attached thereto according to an embodiment.

FIG. 1 shows a work vehicle 1 that is provided with a towing hitch 2, which is arranged displaceable longitudinally in the horizontal direction by means of an actuator 3, in or contrary to the travel direction. FIG. 1 shows the towing hitch 2 both in a first position $X_1$ close to the work vehicle 1, and in a second position $X_2$ at a corresponding distance from the work vehicle 1. As previously discussed, the term "longitudinally displaceable" may mean a displacement in or contrary to the direction of travel. The coupling member 14 may be displaced largely horizontally. The term "largely horizontally" may mean an angle to the horizontal of less than 45°, less than 30°, or in some embodiments less than 15°.

The actuator 3 is driven by an arrangement 4. The supply pressure for the arrangement 4 for driving the actuator 3 is labeled $p_v$. The longitudinal displacement is represented in the figures with the symbol $l_{DB}$. Two positions (e.g., $X_1$, $X_2$) of the towing hitch 2 are shown in FIG. 1. As illustrated in FIG. 1, the first position $X_1$ has a shorter longitudinal displacement $l_{DB1}$ than that of the second position $X_2$, which has a larger longitudinal displacement $l_{DB2}$.

Figure 2:
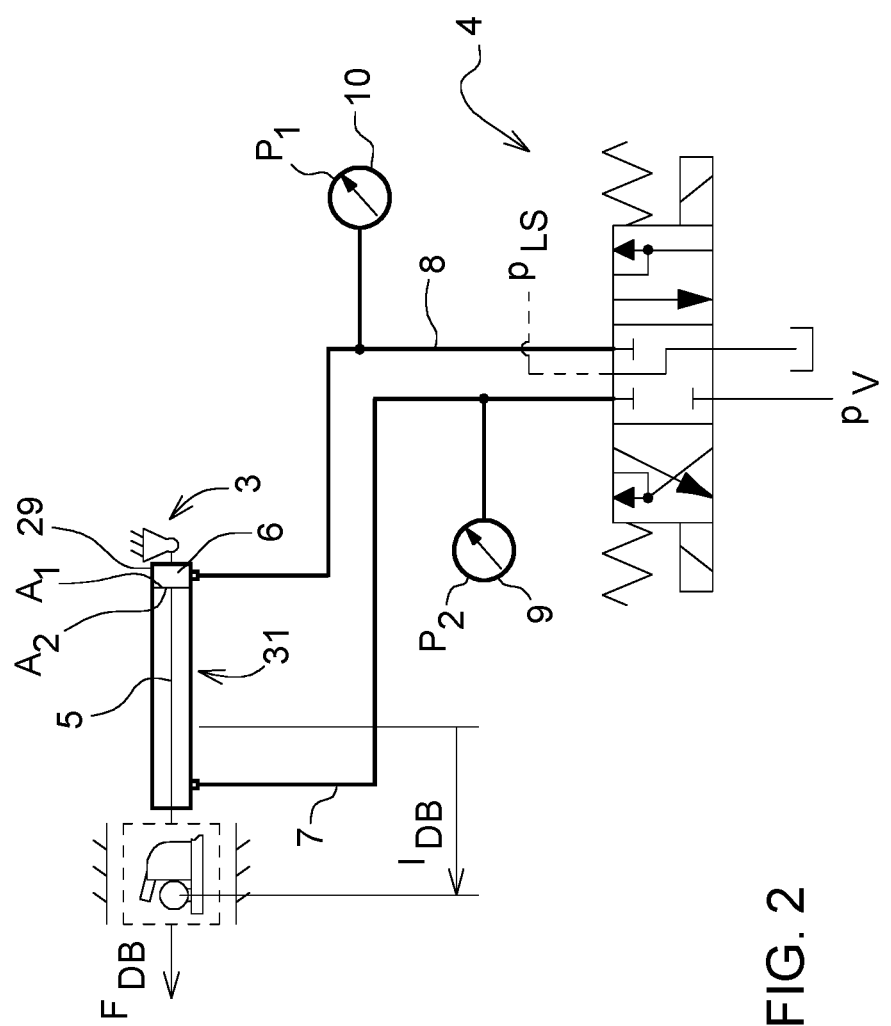
FIG. 2 is a schematic diagram of a hydraulic actuator according to an embodiment.

FIG. 2 shows a schematic illustration of an actuator 3 and an arrangement 4 for controlling or regulating the actuator 3. The actuator 3 is a hydraulic cylinder 31 in which a piston 29 is displaceably arranged, but may vary in other embodiments. For example, in other embodiments, the hydraulic cylinder 31 may include a pneumatic cylinder or other suitable working cylinders specific to design and/or application requirements. In FIG. 2, the reference character $p_{LS}$ designates the load sensing pressure. The piston 29 separates two chambers 5, 6 in the hydraulic cylinder 31. A first line 7 leads to the chamber 5 and a second line 8 leads to the chamber 6.

In comparison to the use of conventional wheel weights, the present disclosure offers the advantage of a continuous shifting of the axle load. This continuous shifting proves particularly favorable relative to the use of wheel weights because wheel weights are only available in fixed weight gradations, for example, 50 kg, 100 kg or 250 kg. In the wheel load distribution, a tensile force $F_{DB}$ may additionally lead to displacement of the axle load from the front to the rear axle 12. The towing hitch 2 according to the present disclosure and the method according to the present disclosure make it possible to compensate for this effect within certain limits. To implement this, the effect of the axle load shift must be quantitatively determined via the tensile force $F_{DB}$. In the presentation in FIG. 2, the towing hitch 2 may be provided with two pressure sensors (i.e., a first pressure sensor 9 and a second pressure sensor 10). The first pressure sensor 9 detects the pressure in the line 7 or the chamber 5. This pressure is designated $p_2$. The second pressure sensor 10 detects the pressure in the line 8 or the chamber 6. The pressure is designated $p_1$.

The tensile force $F_{DB}$ may be determined with the aid of the first and second pressure sensors 9, 10. For example, by determining the pressure $p_2$ in the rod chamber 5 of the hydraulic cylinder 31 and the pressure $p_1$ in the rod-free chamber 6 of the hydraulic cylinder 31, the tensile force $F_{DB}$ may be determined by way of the corresponding respective surface areas $A_2$ and $A_1$ according to the following formula:

$$F_{DB} = A_2 \cdot p_2 - A_1 \cdot p_1 \qquad (Eq.\ 1)$$

For example, the towed load may be determined by determining the tensile force $F_{DB}$, which is important for the driving strategy of the work vehicle 1.

A determination of the tensile force $F_{DB}$ additionally allows an implementation of a braking strategy for the vehicle combination. For braking of the tractor/towed vehicle combination, a force-free tractor/trailer connection is desired, in which the tensile force $F_{DB}$ is equal to zero in an ideal case. By determining the tensile force $F_{DB}$, this objective may be achieved with a suitable braking strategy.

In other embodiments, the towing hitch 2 may include one or more sensors (not shown) that may collect data and then transfer it to a corresponding processing unit, which then determines a position of the coupling member 14 on the basis of the data. In turn, the actuator 3 is driven accordingly so that it brings the coupling member 14 into a position for a given situation by means of a lateral displacement. The processing unit may be an evaluation device, a control device, a regulation device, or other suitable processing device. For example, an electronic data controller such as a PID controller or a programmable logic controller (PLC) may be used for this purpose. The position of the coupling member 14 is determined on the basis of the collected data. A driving behavior of the work vehicle 1 may be achieved.

Figure 3:
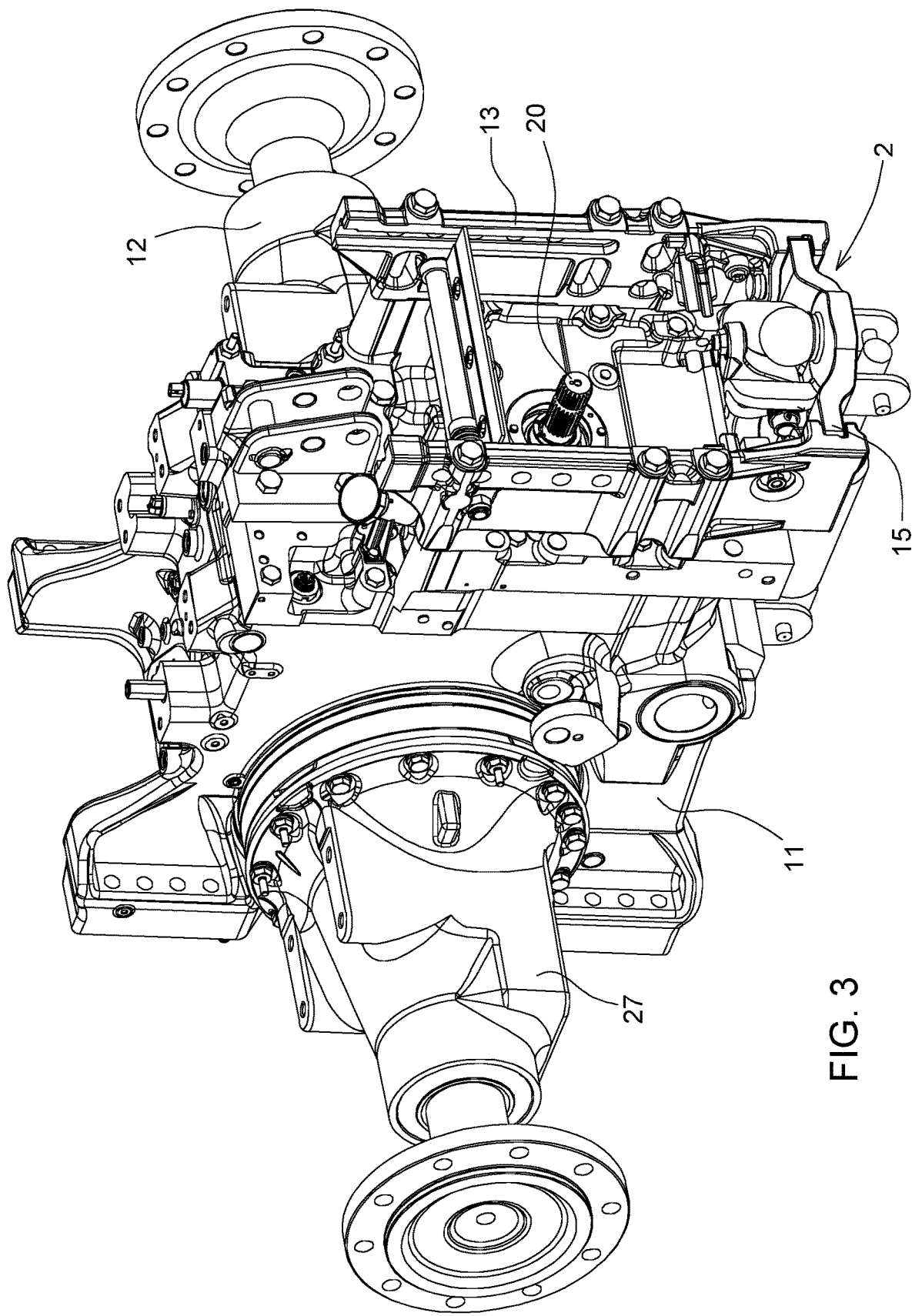
FIG. 3 is a perspective view of a supporting structure of an work vehicle having a towing hitch attached thereto according to an embodiment.

FIG. 3 shows a supporting structure 11 of the work vehicle 1, which structure is constructed in the present embodiment as a rear axle casing 27, and further shows the rear axle 12 of a tractor. An attachment block 13, in which a towing hitch 2 is integrated, is also shown.

Figure 4:
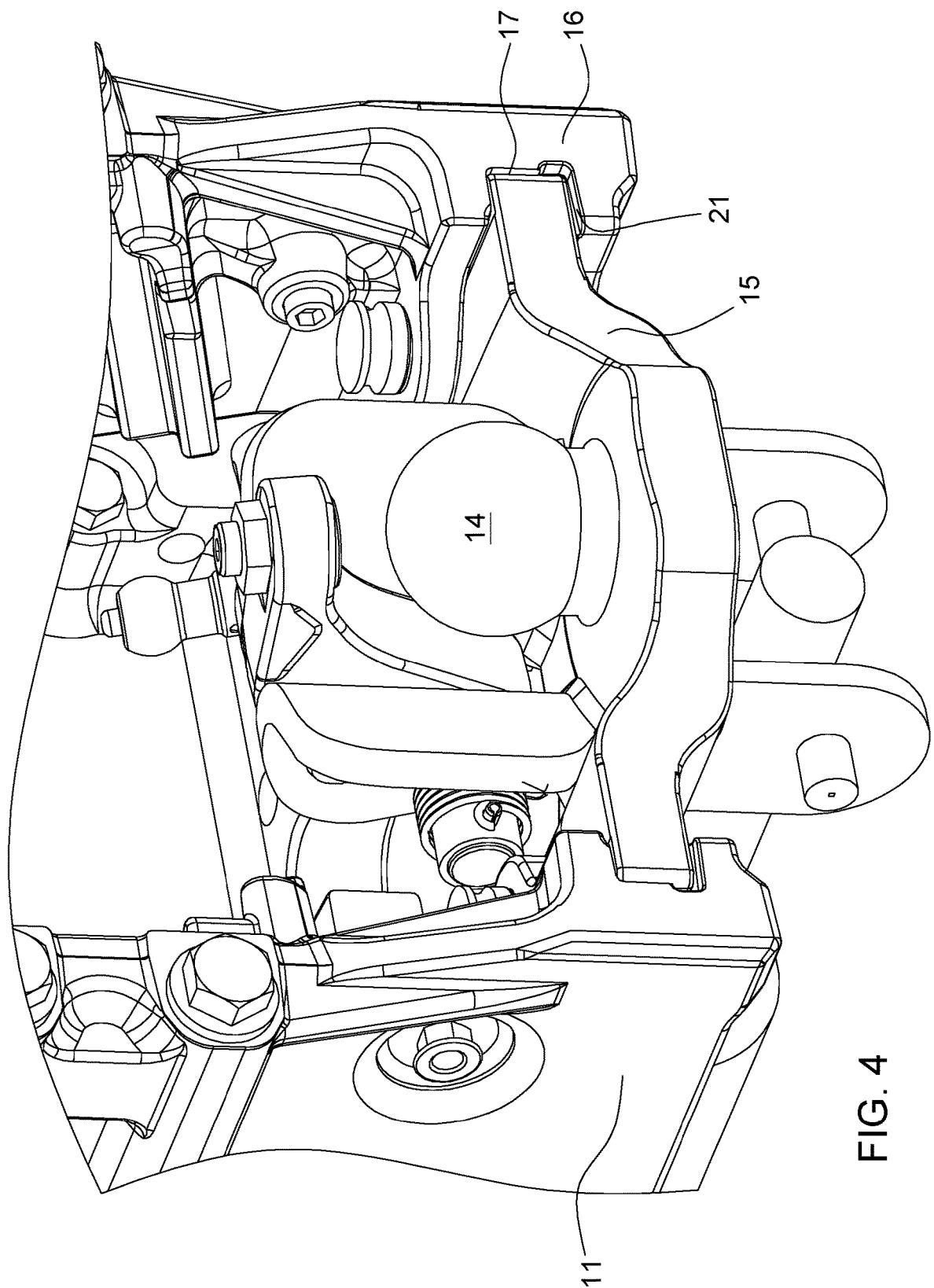
FIG. 4 is an expanded and enlarged representation of the supporting structure of FIG. 3 according to an embodiment.

FIG. 4 shows an enlarged representation of the region in FIG. 3. In the embodiment according to FIG. 4, the coupling member 14 is constructed as a ball-head coupling. The coupling member 14 is arranged on a retaining element 15, which is designed in the embodiment as a plate. The retaining element 15 is displaceably arranged in a guide element 16. In the embodiment, the guide element 16 is a formation of the attachment block 13 that has a groove 21 for guiding the retaining element 15.

The groove 21 of the retaining element 16 may include a generally U-shaped configuration and may be arranged to surround the plate-like retaining element 15 at the laterally outward projecting end faces 17 thereof. According to the present disclosure, the retaining element 15 is arranged displaceably in the longitudinal direction, so that it may be extended to the rear with the actuator 3 shown in FIG. 4.

Figure 5:
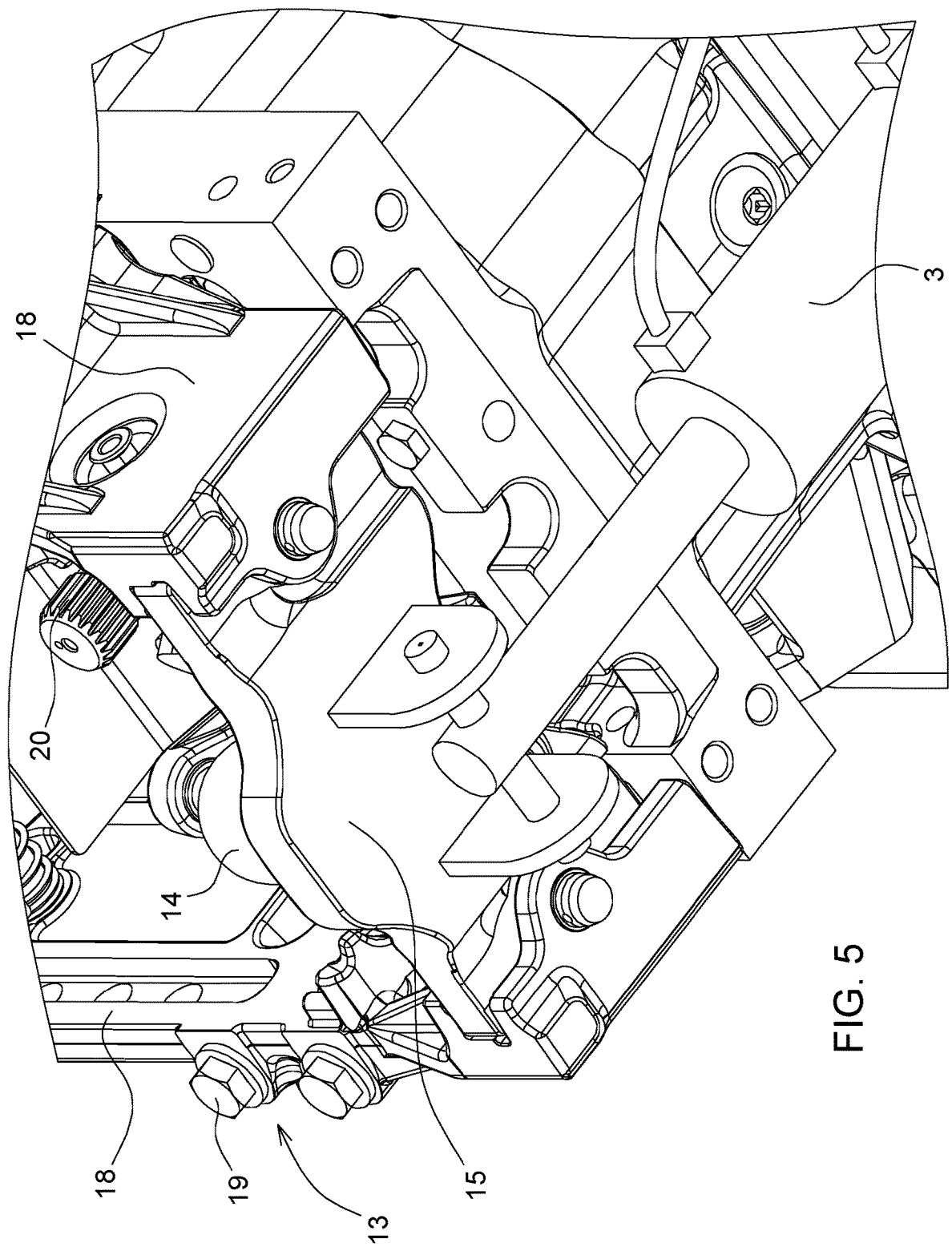
FIG. 5 is a bottom perspective view of a towing hitch according to an embodiment.

FIG. 5 shows a bottom perspective view of the attachment block 13 from below. The attachment block 13 includes two side cheeks 18 which are arranged vertically and parallel to one another. The attachment block 13 is connected by at least one fastening means 19 to a rear-end part of the work vehicle 1. The rear-end part may include a power takeoff casing or a differential casing of the work vehicle 1 such as a tractor.

Figure 6:
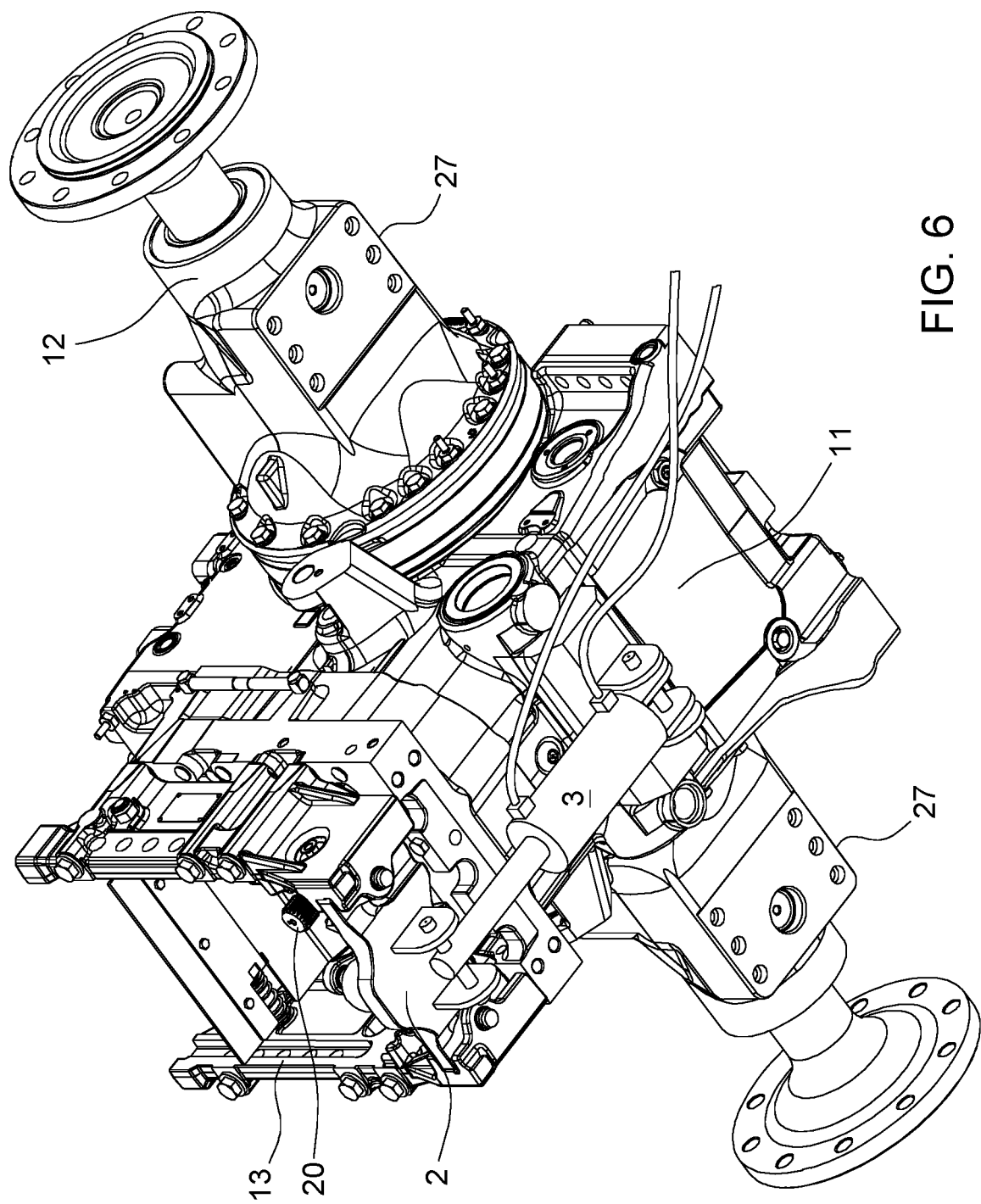
FIG. 6 is a perspective view of a towing hitch according to an embodiment.

A power takeoff 20 is visible in FIGS. 3 and 6. The embodiment according to FIG. 5 shows the actuator 3, which moves the retaining element 15 together with the coupling member 14 within the groove 21 (e.g., a guide groove) axially to the rear.

FIG. 6 shows, in a bottom perspective view, a supporting structure 11 of the work vehicle 1, which is formed by a rear axle casing 27 of the work vehicle 1 (e.g., a tractor), as well as the laterally outward-protruding tractor rear axle 12. The attachment block 13 is connected to the supporting structure 11. The attachment block 13 includes the displaceably arranged towing hitch 2.

Figure 7:
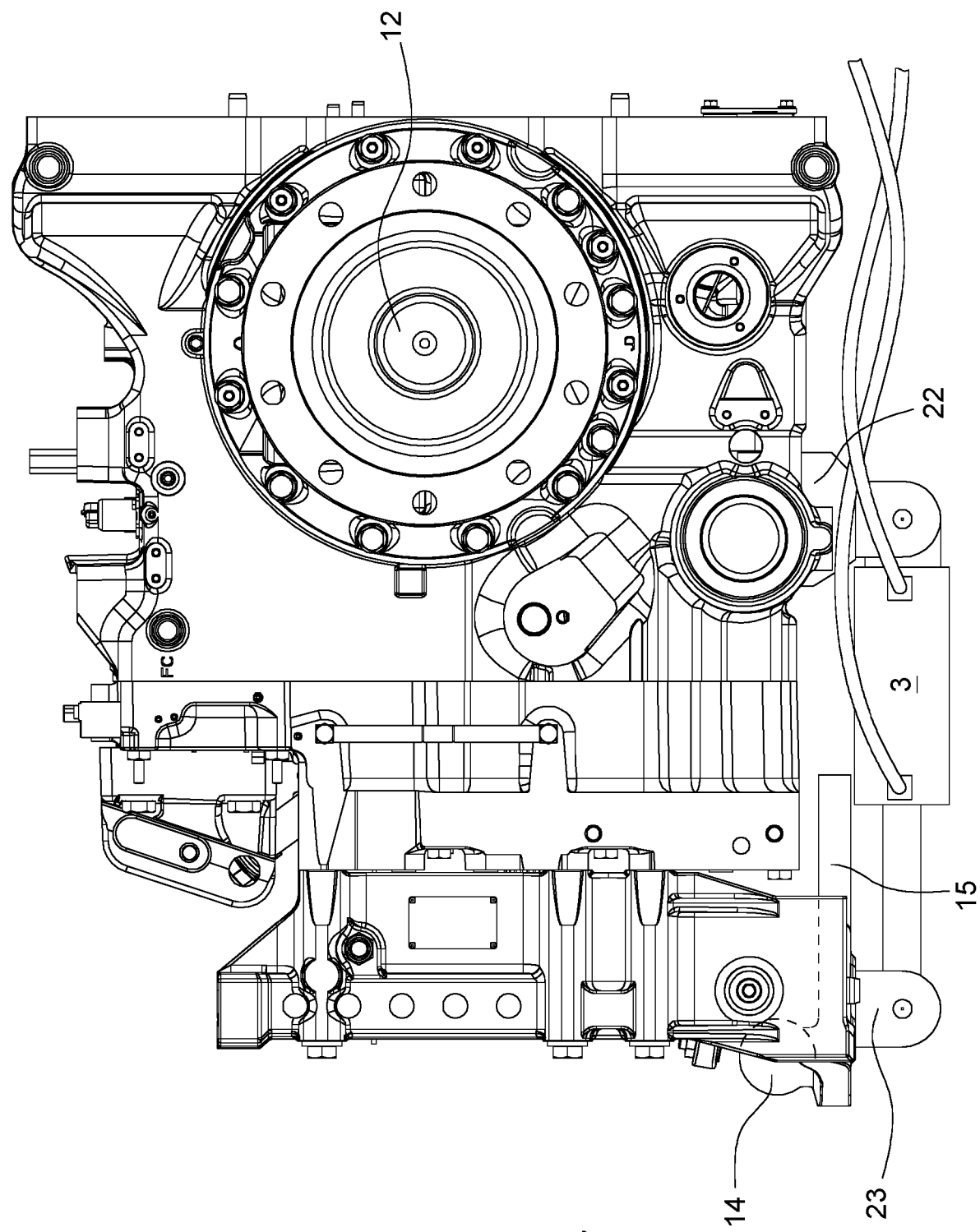
FIG. 7 is a side view of a towing hitch according to an embodiment.

FIG. 7 shows, in a side view, the rear axle casing 27 of the work vehicle 1 (e.g., a tractor) with an attachment block 13 that includes the towing hitch 2. The actuator 3 is connected via a fastening element 22 to the supporting structure 11. For example, as shown in FIG. 7, the actuator 3 may be mounted to a bottom on the rear axle casing 27. At the end of an extendable rod, the actuator 3 has a fastening element 23, with which the extendable hydraulic rod of the actuator 3 is connected to the retaining element 15 of the towing hitch 2. The retaining element 15 is designed according to the embodiment in FIG. 7 as a rectangular plate extending longitudinally in the driving direction. The longitudinal extent enables an extension of the plate to the rear so that the coupling member 14 may be brought into the desired position. The retaining element 15, designed as an elongated plate, is displaced within the groove 21 of the guide elements 16.

Figure 8:
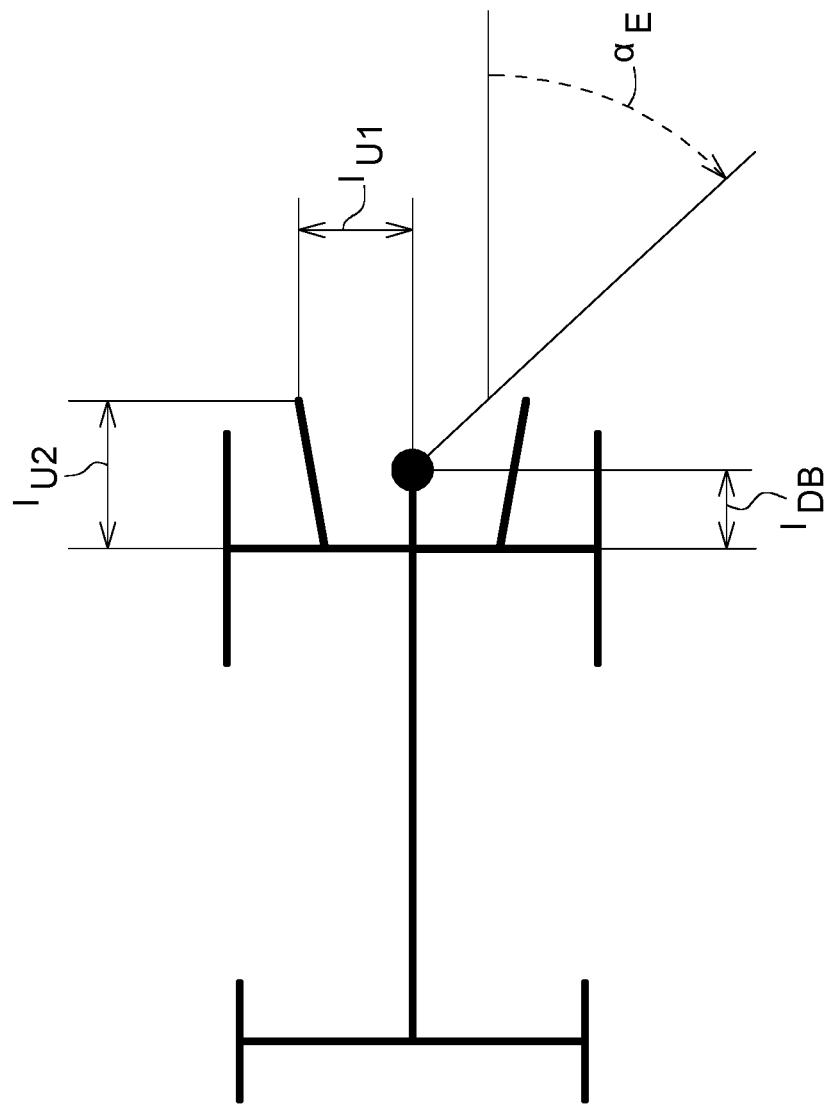
FIG. 8 is a schematic illustration of a work vehicle for calculating the turning radius.
Figure 9:
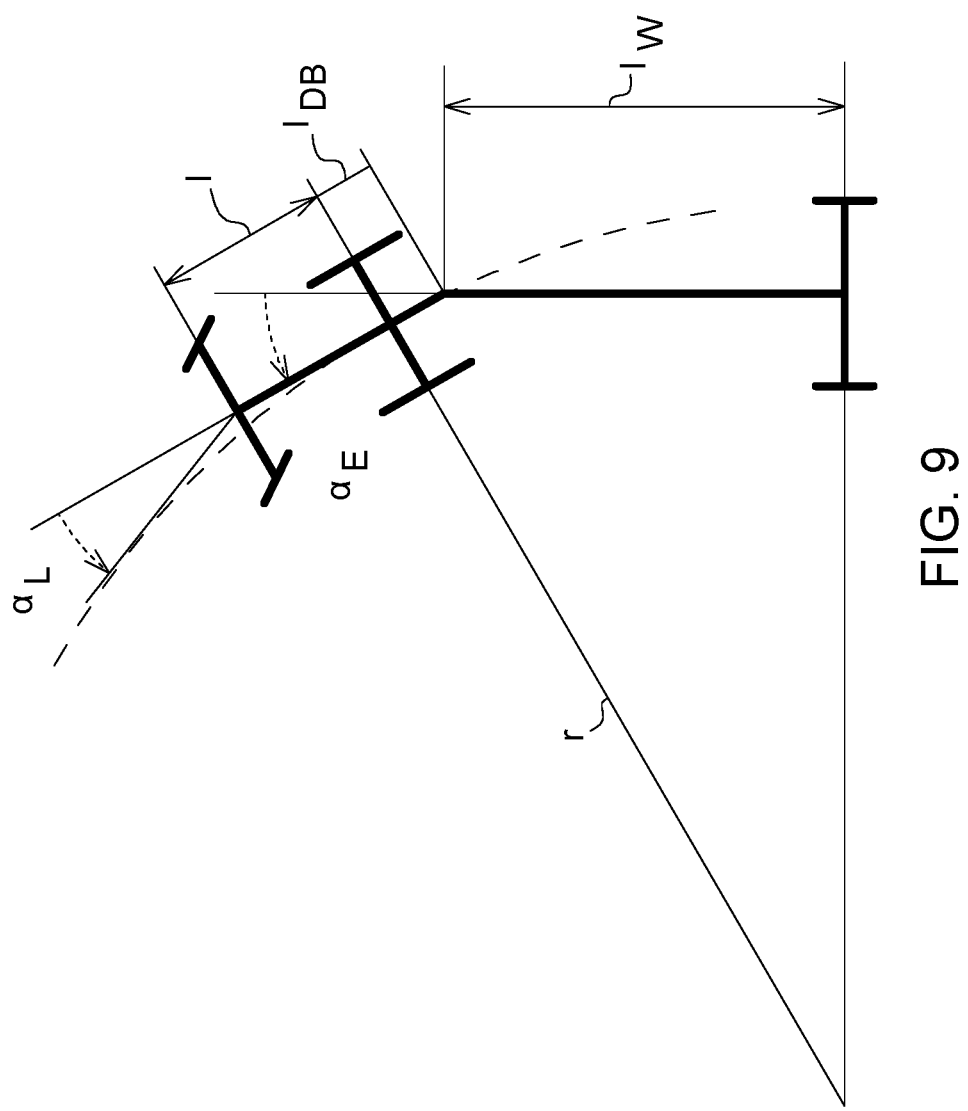
FIG. 9 is a schematic illustration of a vehicle combination for calculating the turning radius according to an embodiment.

FIGS. 8 and 9 show a reduction of the turning radius of a combination of an implement and the work vehicle 1. The maximum turning angle $\alpha_E$ is limited via the lower link of a lifting mechanism. The geometric proportions assumed below are used for illustrating the orders of magnitude and are oriented to typical tractors on the market. With a typical configuration on the market ($l_{DB}=0.7$ m), the following maximum possible turning angle results:

$$\alpha_E = \arctan\left(\frac{l_{U1}}{l_{U2} - l_{DB}}\right) \approx 33° \qquad (Eq.\ 2)$$

which yields the following turning radius of the center point of the rear axle 12 of the tractor:

$$= \frac{l_W + \cos(\alpha_E)l_{DB}}{\sin(\alpha_E)} \approx 13\ \text{m} \qquad (Eq.\ 3)$$

with the steering angle $$\alpha_L = \arctan\left(\frac{l}{r}\right) \approx 12.6° \qquad (Eq.\ 4)$$

With an increase of $l_{DB}$ by $\Delta=0.3$ m to $l_{DB}=1$ m, a significant reduction of the turning radius r may already be achieved:

$$l_{DB} 1.00 m \to \alpha_E \approx 53° \to r \approx 8.9 m \to \alpha_L \approx 18° \qquad (Eq.5).$$

Figure 10:
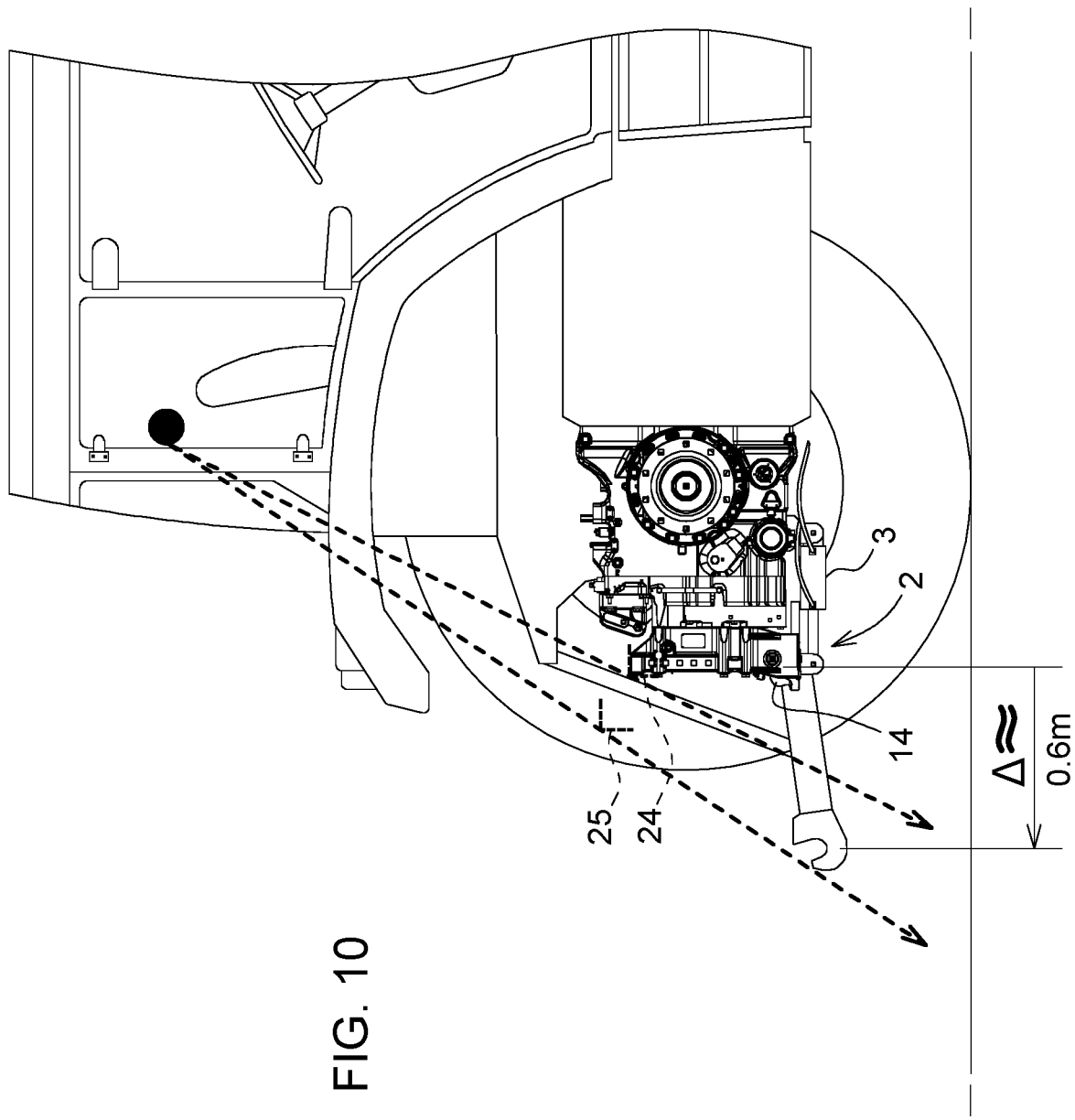
FIG. 10 is a schematic illustration of a working visibility range while hitching.

In FIG. 10, an illustration of the work vehicle 1 having the supporting structure 11 and the towing hitch 2 mounted thereto is shown. For example, FIG. 10 provides an illustration of how the towing hitch 2 according to the present disclosure may guarantee visibility when coupling and decoupling the implement to the work vehicle 1. As shown in FIG. 10, the coupling member 14, designed as a ball-head coupling, may be inserted horizontally in the towing hitch 2 at a lower end of a coupling rail 24. Therefore, it is not visible to the driver from the cab. If a drawbar coupling 25 is installed, it considerably restricts the view of the ball-head coupling. The restriction of the field of view increases with increasing height of the coupling arrangement. If the drawbar coupling 25 is fixed in the highest perforation of the coupling rail 24, the coupling member 14 must be pushed longitudinally by $\Delta \approx 0.6$ m up to the height of the lower links so that it is visible from the cab. This extension preferably takes place without a full support load. If no drawbar coupling 25 is installed, the view is restricted by the coupling rail 24. In this case, an extension of Δ≈0.3 m is sufficient to establish visual contact from the cab.

Figure 11:
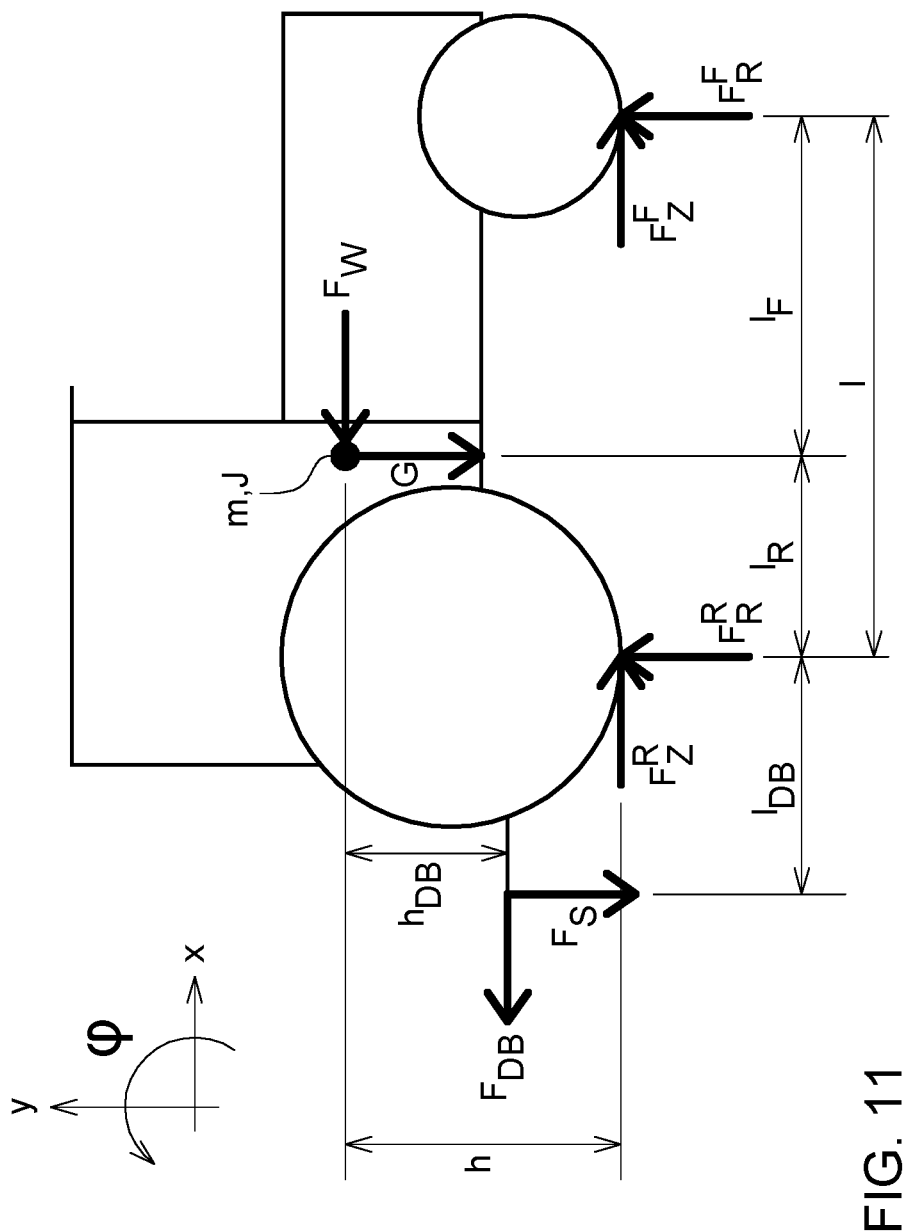
FIG. 11 is a schematic illustration for calculating an axle load displacement.

FIG. 11 shows the mode of operation of the towing hitch 2 of the present disclosure for axle load shifting. In order to be able to represent the influence and the mode of operation of a continuously longitudinally displaceable ball-head coupling, the crucial relationships are initially derived by using a rigid one-body model of a tractor in the plane $$m\ddot{x}=F_Z^R+F_Z^F-F_{DB}-F_W \quad \text{(Eq. 6)}$$

$$m\ddot{y}=F_R^R+F_R^F-G-F_S \quad \text{(Eq. 7)}$$

$$J\ddot{\varphi}=F_Z^F h+F_Z^R h-F_{DB}h_{DB}+F_S(l_{DB}+l_R)+l_F F_R^F-l_R F_R^R \quad \text{(Eq. 8)}$$

The vertical and yawing dynamics are negligible compared to the longitudinal dynamics $$\dot{x}>>\dot{y}\Lambda\dot{x}>>\dot{\varphi}\rightarrow\ddot{y}!=0\Lambda\ddot{\varphi}!=0 \quad \text{(Eq. 9)}$$

The influence of the weight force as a function of the angle of inclination γ is as follows:

$$G=mg\cos(\gamma) \quad \text{(Eq. 10)}$$

$$F_W=mg\sin(\gamma) \quad \text{(Eq. 11)}.$$

The axle loads result as $$F_R^R = \quad \text{(Eq. 12)}$$
$$\underbrace{\frac{h}{l}m\ddot{x}}_{\text{Acceleration}} + \underbrace{\left(\frac{h}{l}\sin(\alpha)+\frac{l_F}{l}\cos(\alpha)\right)mg}_{\text{Increased weight}} + \underbrace{\frac{h-h_{DB}}{l}F_{DB}}_{\text{Tensile force}} + \underbrace{\left(1+\frac{l_{DB}}{l}\right)F_S}_{\text{Support load}}$$

$$F_R^F = \quad \text{(Eq. 13)}$$
$$\underbrace{-\frac{h}{l}m\ddot{x}}_{\text{Acceleration}} - \underbrace{\left(\frac{h}{l}\sin(\alpha)-\frac{l_R}{l}\cos(\alpha)\right)mg}_{\text{Increased weight force}} - \underbrace{\frac{h-h_{DB}}{l}F_{DB}}_{\text{Tensile force}} - \underbrace{\frac{l_{DB}}{l}F_S}_{\text{Support load}}$$

The different influences on the axle loads and the displacement thereof are thus known. Depending on the support load $F_S$ the axle load may be shifted according to the present disclosure by varying $l_{DB}$. Wheel weights are typically mounted on the rear axle 12 up to a total weight of $m_{RG}$=600 kg. With a support load effect of $m_S$=4000 kg, a longitudinal displacement of $$\Delta = \frac{m_{RG}}{m_S}l \approx 0.4 \text{ m} \quad \text{(Eq. 14)}$$

is necessary in order to achieve the identical wheel load increase on the rear axle 12 by using the present disclosure. It should be noted that the increase in wheel load at the rear axle 12 by means of the disclosure leads to a corresponding relief of the front axle. As such, to provide the necessary balance, in other embodiments, the work vehicle 1 may include a front ballast (not shown). In some embodiments, the front ballast may be movably arranged and longitudinally displaced. Such an arrangement is particularly advantageous in that it provides for stability of the work vehicle 1 in various applications and modes of operations. For example, it allows for the position of the towing hitch 2 and/or the front ballast relative to the work vehicle 1 to be shifted during driving operation, which, in turn, may optimize the driving stability.

Without in any way limiting the scope, interpretation, or application of the claims appearing below, a technical effect of one or more of the example embodiments disclosed herein is an improved towing hitch that enables a small turning radius of the work vehicle combination. The towing hitch of the present disclosure is also intended to contribute to a load optimization of the work vehicle (e.g., an agricultural or construction vehicle). In turn, the vehicle combination should have better driving and braking properties as a result of the towing hitch according to the present disclosure. In addition, stable driving behavior should be achieved.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A towing hitch for use with a work vehicle, the towing hitch comprising:
    a retaining element;
    a coupling member coupled to the retaining element;
    a guide element having at least one guide channel formed therein; wherein the guide channel is sized to receive a portion of the retaining element;
    a double-acting cylinder including a piston side chamber and a rod side chamber, the double-acting cylinder coupled to at least one surface of the retaining element, wherein the double-acting cylinder is arranged such that a lateral displacement of the double-acting cylinder moves the retaining element between a first position and a second position within the guide channel;
    a first pressure sensor detecting a first pressure in the piston side chamber; and
    a second pressure sensor detecting a second pressure in the rod side chamber;
    wherein a tensile force is determined based upon the first and second pressures.

2. The towing hitch of claim 1, wherein the coupling member is continuously displaceable.

3. The towing hitch of claim 1, wherein the double-acting cylinder includes at least one of a pneumatic cylinder or a hydraulic cylinder.

4. The towing hitch of claim 1, further including at least one sensor and a processing unit for adjusting a position of the coupling member.

5. The towing hitch of claim 1, wherein the retaining element includes a rectangular plate.

6. The towing hitch of claim 1, wherein the guide element is integrally coupled to an attachment block.

7. The towing hitch of claim 1, wherein the guide channel includes a grooved guide channel.

8. The towing hitch of claim 1, wherein the coupling member is arranged displaceably in and contrary to a driving direction.

9. The towing hitch of claim 8, wherein the coupling member is a ball-head coupling.

10. The towing hitch of claim 1, wherein a braking strategy of the work vehicle and towed vehicle is implemented such that the tensile force is equal to zero during braking.

11. The towing hitch of claim 1, wherein a towed load of a towed vehicle coupled to the work vehicle is determined based upon the tensile force.

12. A method for adjusting a position of a coupling member of a towing hitch of a work vehicle, the method comprising:

positioning the coupling member within a retaining element;

detecting, via a sensor, a data associated with a work vehicle;

determining a first position of the coupling member via a processing unit based on the data;

adjusting the position of the coupling member within the retaining element from the first position to a second position via a double-acting cylinder including a piston side chamber and a rod side chamber;

detecting a first pressure in the piston side chamber via a first pressure sensor;

detecting a second pressure in the rod side chamber via a second pressure sensor; and determining a tensile force based upon the first and second pressures.

13. The method of claim 12, further comprising:

determining a towed load of a towed vehicle coupled to the work vehicle based upon the tensile force.

14. The method of claim 12, further comprising:

implementing a braking strategy of the work vehicle and towed vehicle such that the tensile force is equal to zero during braking.

\* \* \* \* \*